S. P. Smith.
Horse Rake.
No. 102,172.    Patented April 19, 1870.
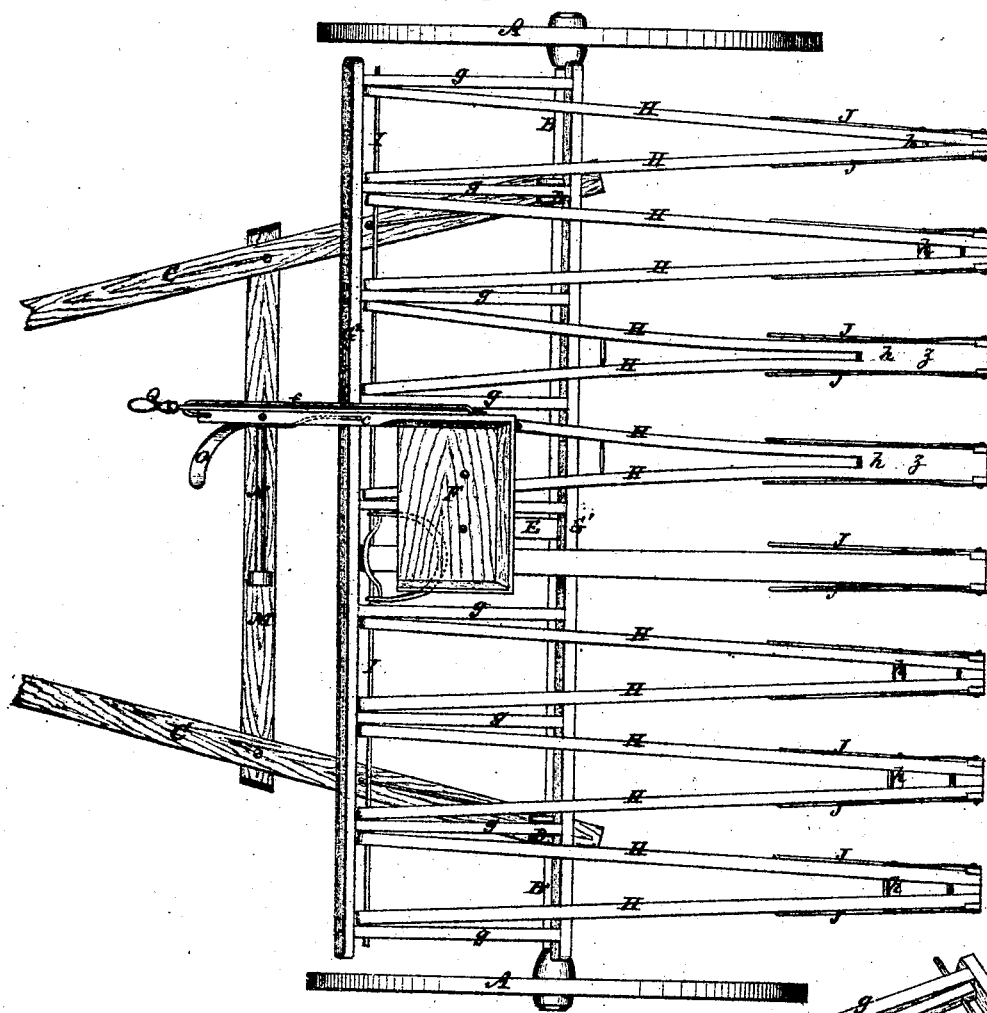
Fig. 1.
Witnesses
Chas. E. Upperman
P. A. Devine
Fig. 4.
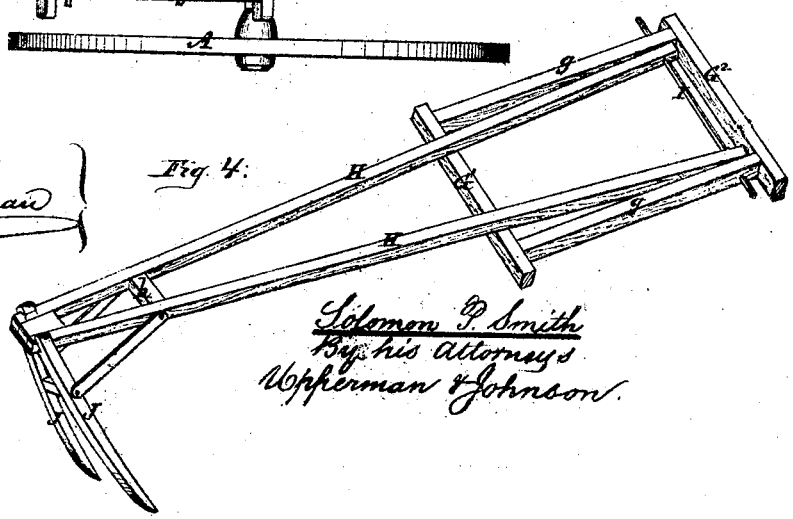
Solomon P. Smith
By his Attorneys
Upperman & Johnson S. P. Smith.
Horse Rake.

No. 102,172.  2 Sheets. Sheet. 2.  Patented. April. 19. 1870.

Witnesses  
Chas. E. Upperman  
P. A. Devine

Solomon P. Smith  
By his Attorneys.  
Upperman & Johnson

United States Patent Office.

SOLOMON P. SMITH, OF WATERFORD, NEW YORK.

Letters Patent No. 102,172, dated April 19, 1870.

IMPROVEMENT IN HORSE HAY-RAKES.

The Schedule referred to in these Letters Patent and making part of the same.

*To all whom it may concern:*

Be it known that I, SOLOMON P. SMITH, of Waterford, in the county of Saratoga and State of New York, have invented certain new and useful Improvements in Horse Hay-Rakes; and I do hereby declare that the following is a full, clear, and exact description thereof, reference being had to the accompanying drawings of the same, which make part of this specification, and in which—

Figure 1 represents a top view of a hay-rake, embracing my improvements;

Figure 4, a view, in perspective, of one of the toothed drag-bars, showing its attachment to a portion of the carrying and tilting-frame.

My improvements relates to that class of hay-rakes in which is employed a tilting-frame carrying hinged drag-bars, to which wooden teeth are secured.

In the accompanying drawings—

A represents the supporting and carrying-wheels, mounted upon an axle, B, to which the thills C are secured and braced.

Three standards, D D and E, are erected upon the axle, to the upper ends of the two outer ones, D, of which the tilting-frame of the drag-bars is hinged, while the central one E supports the seat F of the driver.

The carrying and tilting-frame consists of two parallel bars, $G^1$ $G^2$, placed a suitable distance apart, and secured together by parallel cross-bars $g$, placed at right angles to the bars $G^1$ $G^2$, and at such distances apart as to form separate and distinct compartments for the reception of each pair of the series of drag-bars, as shown in fig. 1 of the drawings. This carrying and tilting-frame is hinged above the axle B by its rear bar $G^1$, and therefore extends forward over the thills.

The drag-bars consist of two spring bars, H H, hinged near the front bar $G^2$ of the tilting-frame by a rod, I, common to all, and extend backward over the rear bar $G^1$ thereof. These drag-bars are open at their hinged ends, and press laterally against the adjacent sides of their respective compartments, and so converge in their direction rearward as to be nearly or quite in contact at their connection with the teeth.

A separating block, $h$, is secured between these bars H nearer their toothed than their hinged ends, the effect of which is to constantly expand their said hinged ends so as to brace them firmly in their respective compartments, while their spring perfectly relieves them from binding from any cause. This feature adds many advantages to a drag-bar rake, constituting, as it does, a lateral compensating double brace to the hinge of each pair of bars, and a double brace to each fixed pair of teeth, while at the same time it allows the latter to twist to either side in passing over and around obstructions, and in turning round while raking. Moreover, the use of separate compartments for each set of drag-bars incloses them so that they shall not depend for lateral bearing upon the adjacent drag-bars.

Figure 2:
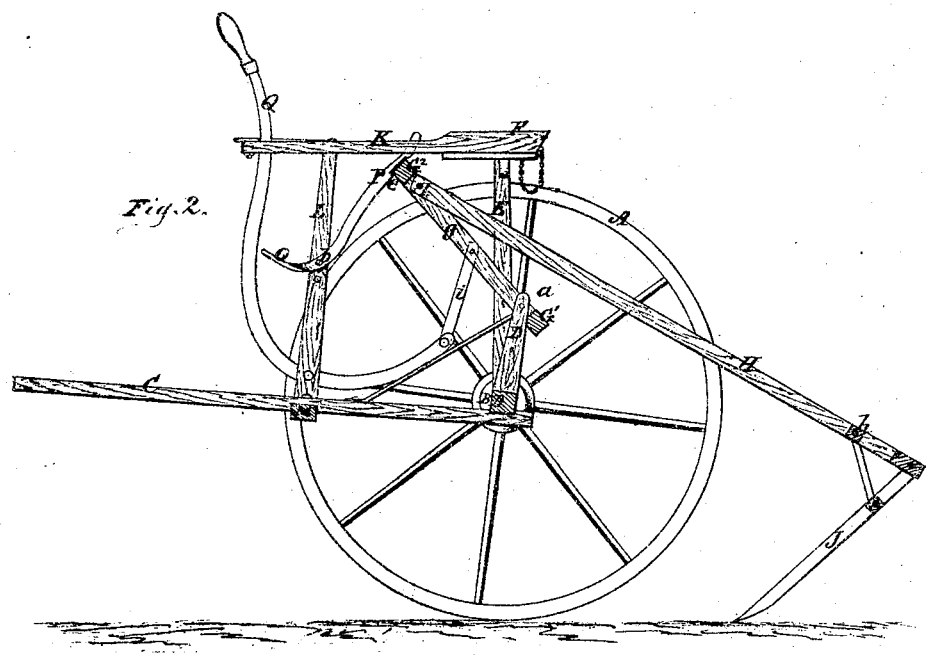
Figure 2 represents a vertical longitudinal section of the same, the several parts occupying the position they do when the rake is in operation.
Figure 3:
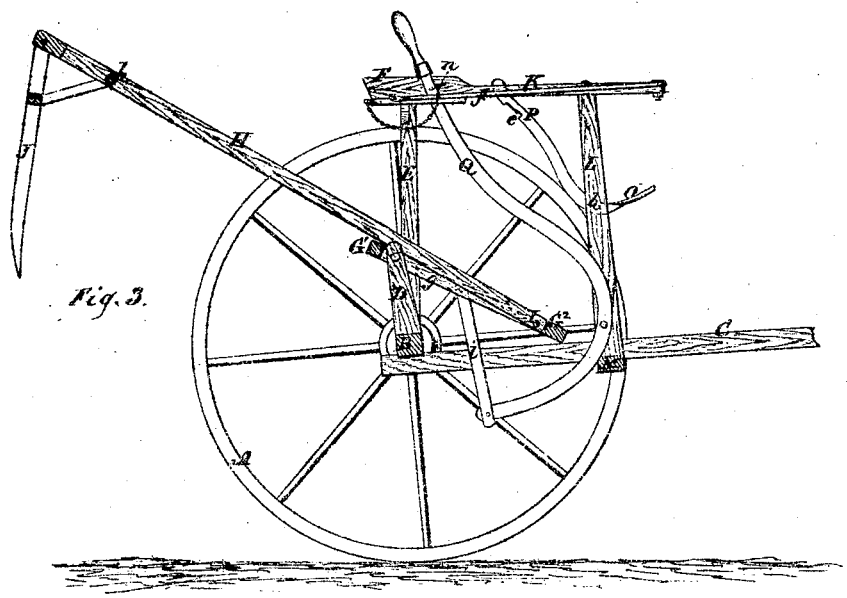
Figure 3 represents a similar section, showing the rake-teeth frame tilted to lift the teeth over the windrow.

The teeth J are secured and braced to the drag-bars H in pairs, and the latter, being also arranged in pairs, mutually strengthen and brace each other. The teeth are secured to the drag-bars at an acute angle, and when resting upon the ground and a tilting-frame locked to its support, a space, $a$, fig. 2, will be left between the drag-bars and the rear bar $G^1$ of the tilting-frame, for the purpose of allowing the teeth of the independent drag-bars to accommodate themselves to any depressions in the surface of the ground below the line of the supporting-wheels, whereby the hay is perfectly gathered and gleaned, notwithstanding surface irregularities.

The tilting-frame and drag-bars being thus arranged and hinged, are nearly balanced, and the former is limited in its ascent and maintained in proper position by contact with the arm K of the raker's seat F, so that the elastic pressure of the material being raked will assist in tilting the frame when the rake is filled.

The front bar $G^2$ of the tilting-frame, when the teeth are raking the cut grass or grain, is locked beneath a horizontal arm, K, extending frontward from the seat F and sustained by a stud, L, erected upon the cross-bar M of the thills to which the foot-rest N of the driver is also secured.

The locking and releasing device of the tilting-frame consists of a foot-lever pivoted to the stud L, near the foot-rest N, so that its foot end O projects laterally in front of the pivot $b$, while its locking end P extends upward and rearward through a slot, $c$, fig. 1, in the arm K, in a position by its weight to constantly rest against the front bar $G^2$ of the tilting-frame, and conform to the arc described by said frame, so that the front bar thereof will always catch into a notch, $e$, near the upper end of said foot-lever, and at the limit of the ascent of the tilting-frame, whereby the latter is sustained in position while the teeth are raking.

When required to unlock the tilting-frame, the driver with his foot presses upon the lateral branch O, so as to release the notched end of the foot-lever, and thus removes the support of said frame, and allows it to tilt and the teeth to rise, which movement is effected by means of a curved hand-lever, Q, pivoted, like the foot-lever, to the vertical stud L, with its handle projecting through a guide, $f$, in the horizontal arm of the seat F, within reach of the driver, and its lower end connected by a link, $i$, to one of the division bars, $g$, of the tilting-frame, so that when said frame is released from its locked position by the pressure of the foot of the driver, he completes the elevation of the teeth by grasping and drawing rearward the handle of the tilting-lever, upon liberating which, after the teeth have passed over the windrow, the toothed ends of the drag-bars descend with sufficient force to bring up the front bar of the tilting-frame and automatically lock it with the foot-lever.

The drag-bars and their teeth may be held up clear of the ground when required, by locking the hand-lever, by means of a pin, $n$, to the side of the seat, and when thus raised the teeth are nearly vertical.

Instead of the drag-bars being made separate they may be cut out of a solid piece, having their rear ends solid as of a single bar, as shown in fig. 1, at $z$, of the drawings.

Having described my invention,

I claim—

1. The arrangement of the pairs of teeth of the twin spring drag-bars firmly and rigidly braced to each other and to the teeth, the inclined hinged tilting-frame, and the parallel division bars $g$, for confining the spring-hinged ends of the drag-bars within separate compartments of said frame, as herein shown and described.

2. In connection with drag-bars united to each other so as to diverge laterally toward their hinged ends, the spreading blocks $h$, for the purpose of imparting to each branch of the twin bar a constant expanding force at their open ends, in the manner herein shown and described.

3. The foot-lever P, maintained in a rearward inclined position by its connection with the arm K, so as to admit of a slight rising and falling motion for the purpose of locking, by its weight, the front bar of a tilting-frame, extending forward of the axle, to support said frame in an inclined position against the upward pressure of the drag-bars when the teeth are raking, as herein shown and described.

4. The combination of the tilting and carrying-frame, constructed with division bars $g$, hinged to and extending forward of the axle, the lateral diverging spring drag-bars, constructed with spreading blocks $h$, the inclined locking-lever P, the hand-lever Q, the seat F, and the supporting frame, the several parts being constructed and arranged as shown and described.

In testimony whereof I have hereunto set my hand.

SOLOMON P. SMITH.

Witnesses:
T. H. UPPERMAN,
A. E. H. JOHNSON.